US010078500B2

(12) United States Patent
Moors et al.

(10) Patent No.: US 10,078,500 B2
(45) Date of Patent: Sep. 18, 2018

(54) METHOD AND SYSTEM FOR AUTOMATIC CODE GENERATION

(71) Applicant: dSPACE digital signal processing and control engineering GmbH, Paderborn (DE)

(72) Inventors: Sebastian Moors, Paderborn (DE); Michael Mair, Rheda-Wiedenbrueck (DE); Tanja Moldenhauer, Paderborn (DE); Volker Straetgen, Bad Wuennenberg (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 61 days.

(21) Appl. No.: 15/273,992

(22) Filed: Sep. 23, 2016

(65) Prior Publication Data

US 2018/0088911 A1    Mar. 29, 2018

(51) Int. Cl.
*G06F 9/44* (2018.01)
*G06F 8/34* (2018.01)
*G06F 8/71* (2018.01)

(52) U.S. Cl.
CPC . *G06F 8/34* (2013.01); *G06F 8/71* (2013.01)

(58) Field of Classification Search
None
See application file for complete search history.

(56) References Cited

U.S. PATENT DOCUMENTS

| 6,081,447 | A | 6/2000 | Lofgren et al. | |
|---|---|---|---|---|
| 6,230,223 | B1 | 5/2001 | Lofgren et al. | |
| 8,019,579 | B1* | 9/2011 | Wey | G06F 9/4443 703/6 |
| 8,180,964 | B1* | 5/2012 | Koh | G06F 11/3442 711/118 |
| 8,448,130 | B1* | 5/2013 | Pillarisetti | G06F 8/447 717/104 |

(Continued)

OTHER PUBLICATIONS

Accurate technoligies, No-Hooks Rapid Pototyping Software, cached Feb. 2, 2015.*

(Continued)

*Primary Examiner* — Insun Kang
(74) *Attorney, Agent, or Firm* — Muncy, Geissler, Olds & Lowe, P.C.

(57) ABSTRACT

A method for generating production code from a block diagram on a host computer is provided. A block in the block diagram has a number of input ports for receiving signals and a number of output ports for sending signals. The processor identifies a first block in the block diagram. The input signal is traced back to a second block upstream of the first block. Compliance with a optimization condition is checked, the optimization condition being fulfilled when a group of adjacent blocks has an assignment operation that affects one or more elements of the input signal while leaving at least one element of the composite variable unchanged. A combined production code is generated for the group of adjacent blocks when the optimization condition is fulfilled so that the combined production code includes write instructions for those elements of the composite variable that are affected by the assignment operation.

17 Claims, 5 Drawing Sheets

(56) References Cited

U.S. PATENT DOCUMENTS

| | | | | |
|---|---|---|---|---|
| 8,689,194 | B1* | 4/2014 | Pillarisetti | G06F 8/35 717/140 |
| 8,706,964 | B1* | 4/2014 | Koh | G06F 12/0888 711/118 |
| 8,762,120 | B1* | 6/2014 | Zhao | G06F 8/30 703/13 |
| 9,841,954 | B1* | 12/2017 | Hillebrand | G06F 8/35 |
| 2003/0132964 | A1* | 7/2003 | Santori | G06F 8/34 715/763 |
| 2004/0154003 | A1* | 8/2004 | Oi | G06F 8/35 717/135 |
| 2009/0044171 | A1* | 2/2009 | Avadhanula | G06F 8/34 717/105 |
| 2015/0169295 | A1* | 6/2015 | Kyoso | G06F 8/34 717/109 |
| 2016/0210380 | A1* | 7/2016 | Mueller | G06F 8/35 |
| 2017/0091462 | A1* | 3/2017 | Kurauchi | G06F 21/577 |
| 2017/0329579 | A1* | 11/2017 | Laethem | G06F 3/0486 |

OTHER PUBLICATIONS

Jaikamal, Advanced Techniques for Simulating ECU C-code on the PC, 2010.*

Erkkinen, "Automatic Code Generation—Technology Adoption Lessons Learned from Commercial Vehicle Case Studies," MathWorks, copyright, 2007.*

Freund et al., "Model-Based Design of ECU Software—A Component-Based Approach," 2000.*

Sandmann et al., Development of AUTOSAR Software Components within Model-Based Design, Copyright © 2008 The MathWorks, Inc.*

Hedge et al., Model Based Approach for the Integration of ECUs, Proceedings of the World Congress on Engineering 2008 vol. I.*

OpenECU Developer Platform Sim-API, Pi Innovo, cached May 2015.*

Hanselmann et al., "Production Quality Code Generation from Simulink Block Diagrams," Proc. of 1999 IEEE Int'l Symp. on Computer-Aided Control Systems, pp. 213-218 (Aug. 1999).

* cited by examiner

Struct S;
F()
{
S2.a = S.a;
S2.b = S.b;
S2.b[3] = DoSth(S.b[3]);
S2.c = S.c;
Write(S,S2);
}

Struct S;
F()
{
...
value = DoSth(S.b[3]);
if (S.b[3] != value)
{
    Write(S.b[3], value);
}
}

METHOD AND SYSTEM FOR AUTOMATIC CODE GENERATION

BACKGROUND OF THE INVENTION

Field of the Invention

The present invention relates to methods and computer systems for automatically generating code from block diagrams, the code preferably being used in electronic control units.

Description of the Background Art

Electronic control units (ECUs) are ubiquitous especially in automotive applications. Generally, they may contain a processor, in particular a microcontroller, one or more sensor interfaces and one or more circuits to control an actuator. Current parameters of a physical process are determined using the signals of the one or more sensors connected to the sensor interfaces. Based on a predefined control strategy, the processor may control the one or more circuits to apply the actuators in order to influence the physical process. In a particular example, an ECU may be used to perform anti-lock braking, with a sensor measuring the wheel velocity and a magnetic valve reducing the pressure in the corresponding wheel brakes.

In order to speed up the development process for ECUs, control strategies are developed using block diagrams in a technical computing environment (TCE), which allows for tracing the temporal behavior of a physical system described by one or more blocks in the block diagram. One particular example of a TCE is MATLAB/Simulink of The MathWorks.

The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program. The program may be a control program for an ECU, the control program implementing the desired control strategy.

Modern ECUs generally provide a nonvolatile memory for saving state variables and/or calibration data such as a current odometer value or learning data, in particular current parameters, for adaptive control algorithms. When the nonvolatile memory is e.g. realized as a flash memory, the nonvolatile memory may experience wear. Depending on the number of write cycles, data loss may occur. Further, the write speed of the nonvolatile memory may be slow.

Thus, improved methods for reducing wear and/or increasing an effective write speed when writing data to a special medium, such as nonvolatile memory, are desired.

SUMMARY OF THE INVENTION

It is therefore an object of the present invention to provide a method and computer system for automatically generating production code from a block diagram.

In an exemplary embodiment of the invention, computer-implemented methods for generating production code from a block diagram in a technical computing environment on a host computer are provided. A block in the block diagram may comprise a number of input ports for receiving signals and a number of output ports for sending signals. The methods can comprise: identifying a first block in the block diagram which comprises a write operation of a composite variable to a special medium, wherein the first block receives an input signal that is composed of one or more elements of the composite variable comprising a plurality of elements; tracing back the input signal to a second block upstream of the first block, the first block and the second block forming a group of adjacent blocks; checking compliance with a optimization condition, the optimization condition being fulfilled when the group of adjacent blocks comprises an assignment operation that affects one or more elements of the input signal but leaves at least one element of the composite variable unchanged; and generating a combined production code for the group of adjacent blocks when the optimization condition is fulfilled, so that the combined production code comprises write instructions only for those elements of the composite variable that are affected by the assignment operation.

The inventive method allows for reducing the number of write operations on a special medium. This may be useful in a number of cases.

The special medium may be, for example, a memory or a storage medium with an effective write speed lower than a predefined threshold and/or a limited number of permissible write cycles, such as flash memory. Even when write operations are carried out indirectly via a buffer, the necessity of writing data in large chunks may lead to a low effective write speed. Thus, reducing the number of write operations may increase the lifetime of the special medium as well as decreasing the execution time of the generated production code. In alternative embodiments, the special medium may be a wireless or wired network connection or a storage medium that is accessed via a network connection, so that reducing the necessary time for a data transfer may be more important than a reduced wear.

The composite variable may correspond to a composite signal, such as a bus, or it may correspond to a minimum data size to be written. For example, it may comprise a defined number of words. A minimum data size to be written may be defined by a specific hardware element, e.g. by the block size of a flash memory chip. The input signal may be a composite signal up to a size corresponding to the composite variable, it may be a signal composed of some elements that correspond to a part of the composite variable, or it may be a scalar signal comprised in the composite variable. The elements of the input signal may all be of the same data type or some elements may be of differing data types.

The steps of the inventive methods may be carried out by a processor running different software components on the host computer, the software components preferably using the mechanisms of the technical computing environment or of the operating system of the host computer to exchange data and/or cause the execution of one or more further software components. For example, the technical computing environment may comprise and/or be interfaced to a code generator that converts one or more blocks of the block diagram to production code and when the conversion is finished, the code generator may invoke a production code compiler in order to compile the production code to an executable. The processor of the host computer may be a general-purpose microprocessor with high computational speed and no strict limitation on the thermal power produced during the computation.

The host computer may be realized as a single standard computer comprising a processor, a display device and an input device. Alternatively, the host computer may comprise one or more servers comprising one or more processing elements, the servers being connected to a client comprising a display device and an input device via a network. Therefore, the technical computing environment may be executed partially or completely on a remote server, such as in a cloud computing setup. A graphical user interface of the technical computing environment may be displayed on a portable computing device, in particular a computing device with a touch screen interface. Also, the computations for executing the block diagram can be carried out on a remote server.

The technical computing environment may comprise a graphical user interface for modifying the block diagram and a simulation engine for executing the block diagram, so that the dynamical system described by the block diagram can be simulated. The block diagram may comprise multiple blocks with input and/or output signals that are connected to output and/or input signals of other blocks. Each block may be an atomic functional unit or may be composed of a plurality of subordinate blocks. For example, one or more blocks of the block diagram model the desired behavior or intended functionality of the control program. Other blocks may for instance represent test input stimuli for the modeled control program or a plant model connected to the modeled control program to form a model of the complete dynamic system and to provide a closed control loop. Blocks may be connected via signals in order to exchange data; a bus containing a plurality of binary signals is a particular example of a composite signal. When an input port of a first block and an output port of a second block are connected via a signal, the second block is upstream of the first block. Signals may, but need not be visible in the modeling environment; alternatively, two blocks may be linked implicitly by indicating a connection via indicators specifying one or more connected blocks. Information concerning signals or blocks may be stored in a data definition tool that comprises a separate data storage, e.g. a database or one or more files, so that production code may be generated based on additional data in the data definition tool.

The production code may be adapted to a specific processor, e.g. a particular microprocessor or a programmable logic element, a specific set of language operations, e.g. compliant to a predefined restricted language standard, and/or may be an optimized code, so that e.g. the number of processing operations may be minimized and/or limited to a certain threshold and/or maximum execution time. In an embodiment of the invention, an additional user interface is provided for selecting the scope and/or extent and/or criteria for optimization of the generated production code.

An operation may be primarily an action in the model, e.g. assigning a new value to a signal or to an element of a composite signal. A block containing an assignment operation may be preceded by a block for calculating a new value. For example, these blocks may be considered as one block during code generation. An assignment operation may comprise a selection of one or more elements of a composite variable or signal and a change operation.

A block corresponding to a special medium can be indicated via a marker in the block or via a marker in an input signal received by the block. For example, a marker can be set by a user editing the block diagram in a graphical user interface of the technical computing environment.

When the optimization condition is not fulfilled, exemplary embodiments of the inventive methods additionally comprise: Tracing back the input signal to a leading block upstream of the current group of adjacent blocks, thus enlarging the group of adjacent blocks; checking compliance with a secondary condition, the secondary condition being fulfilled when the leading block comprises an assignment operation that affects one or more elements of the input signal while leaving at least one element of the composite variable unchanged; and generating a combined production code for the group of adjacent blocks, i.e. the enlarged group of adjacent blocks, when the secondary condition is fulfilled, so that the combined production code comprises write instructions only for those elements of the composite variable that are affected by the assignment operation.

Thus, a number of adjacent blocks connected by a composite signal may be traversed in an iterative manner to determine if, after an appropriate enlargement, a group of adjacent blocks exists for which a combined or optimized production code can be generated. Corresponding write operation optimizations can be applied even when different blocks select different elements of the input signal, so that one block changes a first part of the input signal and another block changes a second part of the composite signal. Additionally, a third part of the input signal may remain unchanged. By generating a combined production code also for enlarged groups of adjacent blocks, potential wear of the special medium is reduced even further.

In an embodiment, the tracing back of the composite signal is continued in iterations, so that a further block becomes the leading block for a further enlarged group of adjacent blocks in each iteration, until the secondary condition is fulfilled or one or more of the following stopping conditions are fulfilled: an intermediate block in the group of adjacent blocks changes the signal in its entirety; a predefined number of adjacent blocks has been traced back; a group of adjacent blocks is bigger than a given threshold after having been enlarged; or a boundary of the defined system or subsystem has been reached, in particular so that there exists no further leading block upstream of the group of adjacent blocks in the given hierarchical level of the block diagram.

In an example, when the input signal comprises all elements of the composite variable, checking compliance with the secondary condition also comprises checking compliance with an auxiliary condition, the auxiliary condition being fulfilled when no intermediate block in the group of adjacent blocks changes the composite signal in its entirety.

According to an embodiment of the invention, generating a combined production code includes, prior to actually generating the code, tracing back the input signal to a further block upstream of the group of adjacent blocks, checking compliance with an enhancement condition, the enhancement condition being fulfilled when the further block comprises an assignment operation that affects one or more elements of the input signal but leaves at least one element of the input signal unchanged, and including the further block in the group of adjacent blocks when the enhancement condition is fulfilled. When the further block comprises an assignment operation, a block for providing new input values to elements of the input signal may be considered as being part of the assignment block, so that these blocks are treated as one block. This is particularly useful when the input signal is a bus, and an element of the input signal may be represented e.g. by a vector. When the further block comprises an assignment operation that affects e.g. only one element of the vector, these two cascaded assignment blocks can be represented by one single write instruction in the production code.

The block diagram can contain at least two different hierarchical levels, a higher level, where a limited number of subsystems is defined, and wherein the properties of the subsystems are defined more precisely by blocks in a subordinate hierarchical level. In particular, the inventive method may be carried out for blocks in a subordinate hierarchical level.

According to an embodiment of the present invention, when a first block receives more than one input signal, the steps can be carried out independently for each input signal, so that a group of adjacent blocks is created for each for each input signal, that compliance with the optimization condition or compliance with the secondary condition is being checked, and that a combined production code is generated for each group of adjacent blocks which fulfill the optimization condition or the secondary condition, so that the combined production code comprises write instructions only for those elements of each input signal that are affected by the assignment operation.

In an embodiment of the present invention, the combined production code contains instructions to compare a previous value of the one or more elements of the composite variable affected by an assignment operation with a new value to be written, and the write instructions are only carried out when the previous value differs from the new value.

The inventive method may be particularly advantageous when those elements of the input signal that are potentially changed correspond to a small fraction of the composite variable written in the first block. In that case, the effective write speed is very low, because even a change of only a single bit results in writing the entire composite variable that generally may comprise hundreds or even thousands of bits. For nonvolatile memory, read operations are generally faster than write operations and do not cause wear. Thus, reading the same memory location that is to be written and ensuring that write instructions are indeed necessary both reduces wear and increases the effective write speed. In some cases, reading and writing the composite variable may be performed indirectly via a buffer. In particular, the composite variable may correspond to the entire buffer.

In an embodiment of the present invention, an input signal of the first block can be being read from an initial block upstream of the first block, wherein the initial block corresponds to the same composite variable as the first block. For an AUTOSAR environment, the special medium may be defined as a data store memory block, so that the first block may be a data store write block and the initial block may be a data store read block. Alternatively, the initial block may be an input port that is associated with a special medium, and the first block may be an output port associated with the same special medium or the same address in a special medium.

According to an embodiment of the invention, the input signal is a composite signal being created by assembling a number of signals of elements, i.e. signals of an elementary data type, in a combination block upstream of the first block. The combination block may in particular be a bus creator block or any block comprising a combination operation for assembling multiple signals.

In an embodiment of the present invention, an assignment operation that affects one or more elements of the input signal can be implemented by the combination of a selector block comprising a selection operation and a calculation block comprising a calculation of a new value for the one or more selected elements, and wherein the selector block and the calculation block are considered as one block and added to the group of adjacent blocks. The calculation block may also be a constant block, so that the "calculation" includes setting a constant value.

The composite variable may comprise a vector and/or a matrix and/or a structure and/or the input signal may be a bus. A bus may be represented by a structure that can be defined separately as an assembly of two or more elements. A structure may e.g. be defined by the "struct" keyword in the C programming language. When the production is generated in an object-oriented programming language, a composite signal may also comprise an object. Generally, a matrix need not be restricted to two dimensions but may possess a higher dimensionality. In an embodiment of the invention, a vector or a matrix may have busses as elements, i.e. the composite signal may be a vector of busses.

If the composite signal comprises a vector or a matrix, an assignment operation that affects one or more elements of the input signal while leaving at least one element of the composite variable unchanged can be determined by identifying assignment operations that concerns only a limited number of indices in the whole set of indices of the vector or matrix.

According to an embodiment of the invention, write instructions for writing on the special medium can be carried out indirectly via a buffer comprising the entire composite variable, and the buffer is written in its entirety when at least one element of the composite variable has been affected by an assignment operation. Especially when comparing to previous values, the inventive method minimizes write instructions and thus limits the impact of the reduced effective write speed.

One aspect of the invention also relates to a non-transitory computer readable medium containing instructions that, when executed by a microprocessor of a computer system, cause the computer system to carry out an inventive method as described herein.

In a further aspect of the invention, a computer system is provided which comprises a processor, a random access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out an inventive method.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which can be configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
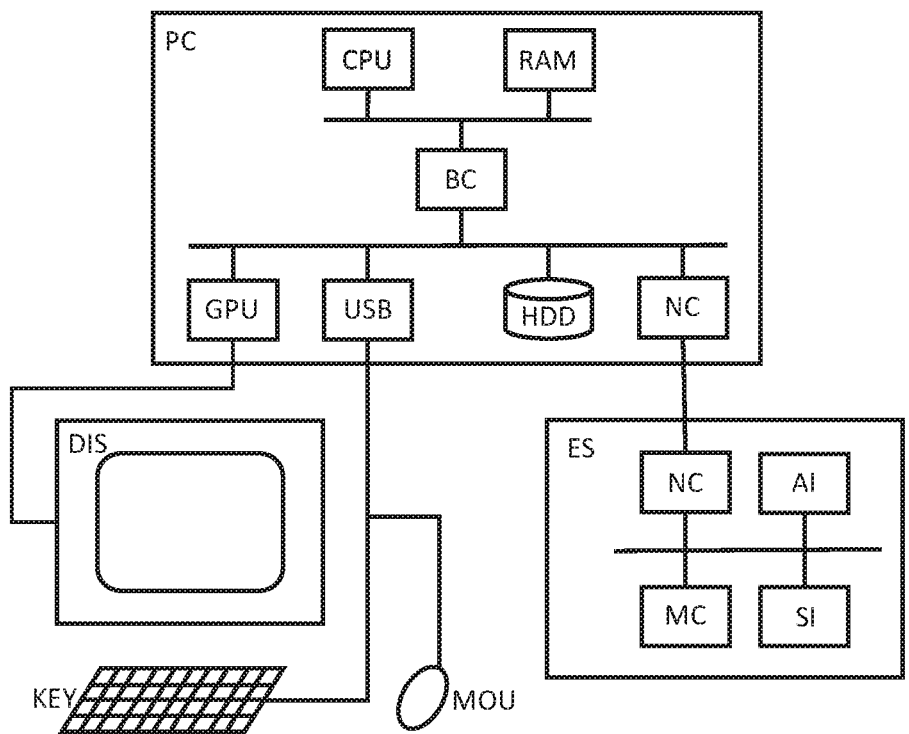
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. For example, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

In alternative embodiments of the invention, which are not shown in the figure, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface or a virtual reality device.

In alternative embodiments of the invention, which are not shown in the figure, the computer system does not comprise an embedded system ES. While the embedded system ES is useful for carrying out a processor-in-the-loop simulation of a control program, the presence of an embedded system may not be necessary for carrying out the present invention.

Figure 2:
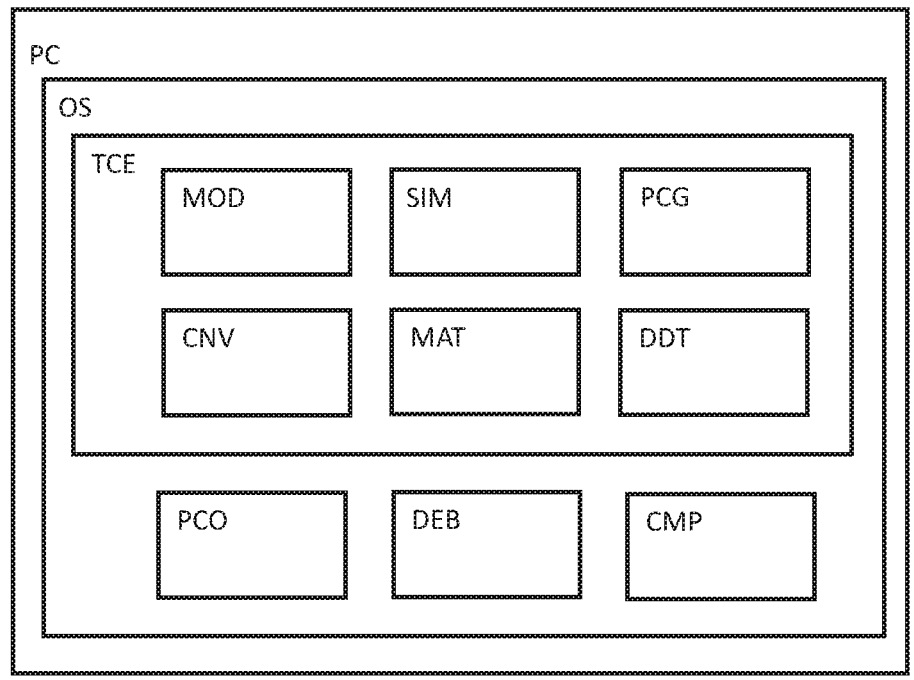
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as MICROSOFT WINDOWS or a LINUX distribution.

On the host computer PC, a technical computing environment TCE such as MATLAB SIMULINK of THE MATHWORKS may be installed. Other examples of technical computing environments comprise LABVIEW of NATIONAL INSTRUMENTS or ASCET of ETAS. The technical computing environment TCE comprises a plurality of software components such as a modelling environment MOD, a simulation engine SIM and a converter CNV. Additionally, the TCE may comprise a mathematical and/or script interpreter MAT that is adapted for carrying out calculations or modifying data. The TCE comprises a production code generator PCG that is adapted to produce production code from a model; further, it may comprise a data definition tool DDT. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox for the modelling environment.

The modelling environment MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional block diagram in a subordinate hierarchical level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the modelling environment MOD in order to observe the temporal behavior of the dynamic system described by the block diagram. The execution of a block diagram may also be called a model-in-the-loop simulation of the dynamic system and can be carried out using high-precision operations in order to observe the behavior more closely and to create reference data.

A converter CNV may be invoked to convert the block diagram to a form that can be simulated more quickly. The form may for instance be simulation code such as plain C-Code containing high-precision operations. Thus, the converter CNV may e.g. comprise a code generator for generating simulation code and a simulation code compiler. In order to speed up the conversion process, code generator and/or compiler may not apply any optimizations or limit the extent of applied optimizations. The use of a converter allows for simulations in an accelerated mode, so that the time for carrying out the calculations in a simulated time step is reduced. The simulation code compiler is can be adapted for enhanced compatibility with the simulation engine of the TCE. In the case of MATLAB SIMULINK, the simulation code compiler may e.g. be used to compile a communication function, in particular an S-function.

The production code generator PCG allows for creating production code from one or more blocks in a block diagram. Production code may be optimized for readability, traceability, safety, low-energy consumption, execution speed and/or memory requirements. For example, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. A particularly preferred production code generator PCG is TARGETLINK of dSPACE.

The data definition tool DDT provides a local or remote database for storing definitions and parameters as well as an application-programming interface for automatic exchange of the data between different software components. This allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, such as SystemDesk of dSPACE, the data definition tool DDT can be used as part of a higher-level tool chain, in particular to generate product code compliant to the AUTOSAR standard. A preferred data definition tool is TargetLink Data Dictionary of dSPACE.

Other software components such as a production code compiler PCO, a debugger DEB or a comparison tool CMP may also be installed on the computer. These software components may be interfaced to each other and/or the technical computing environment using standard mechanisms of the underlying operating system OS. The compiler COM may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
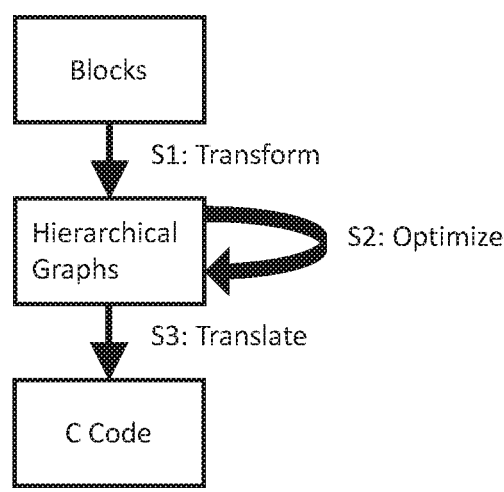
FIG. 3 is an exemplary diagram of a method for generating production code from a block diagram.

FIG. 3 illustrates an exemplary embodiment of the generation of production code from one more blocks in a block diagram. The following steps can be carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, for example, C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format or AUTOSAR XML information.

In alternative embodiments, hardware-level code or a configuration for a programmable hardware device may be created from the blocks describing the control program.

Figure 4:
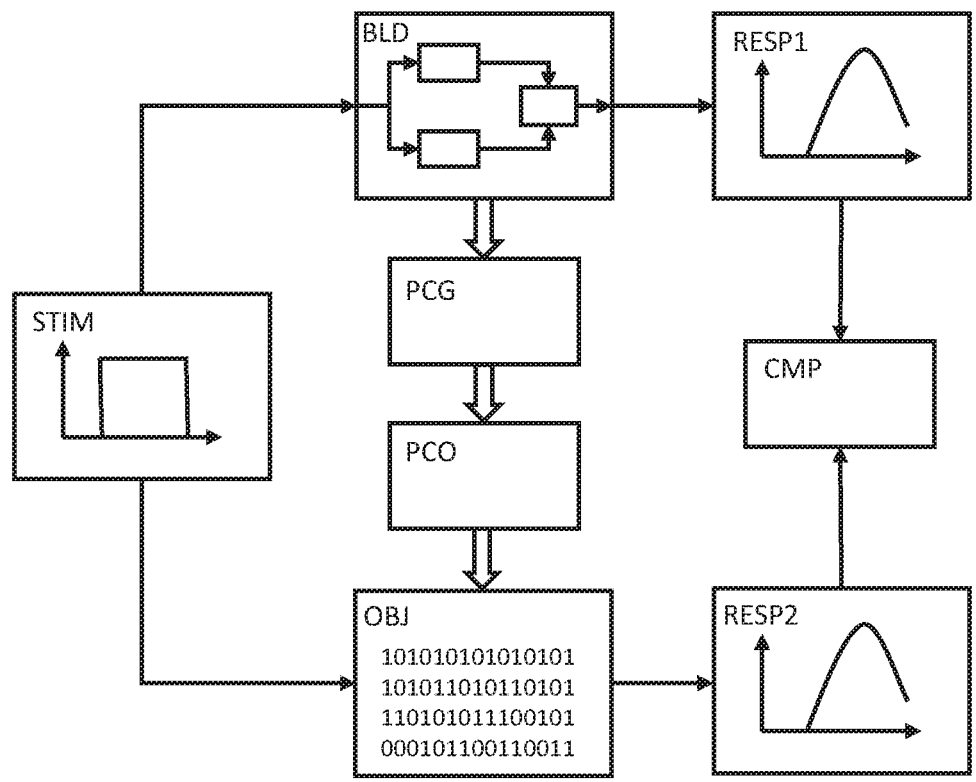
FIG. 4 is an exemplary diagram of a method for testing the compliance of the executable with a model specifying the desired behavior.

FIG. 4 displays an exemplary embodiment of a method for compiling and testing a control program.

The modelling environment MOD of the TCE can comprise a graphical user interface for modifying a block diagram BLD, which may comprise a plurality of blocks interconnected by signal paths. Each block may be an atomic block providing a specific functionality or it may represent a subsystem or a submodel, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

A number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine actually describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a particular processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. The output signals can be compared point by point. For example, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
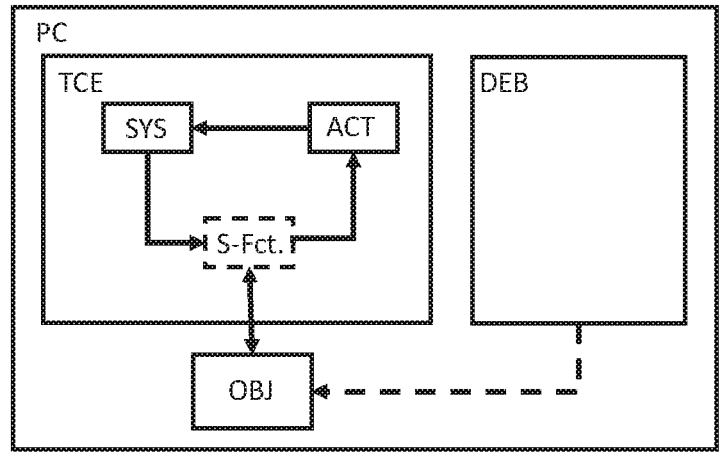
FIG. 5 is an exemplary diagram of a software-in-the-loop simulation.

FIG. 5 illustrates an exemplary embodiment of a software-in-the-loop simulation, i.e. a simulation for which production code is generated and compiled, the resulting executable then being run on the host computer. In a software-in-the-loop simulation, the effect of converting high-precision operations to lower-precision operations on the accuracy of the control can be observed. When high-precision operations, in particular operations on a double precision data type, are converted to lower-precision operations, in particular fixed-point operations, quantization errors, overflows or saturation effects may occur.

As indicated by the outermost rectangle, each step of a software-in-the-loop simulation is carried out by a processor of the host computer PC. The host computer may e.g. be realized as a personal computer running a standard operating system such as WINDOWS or LINUX. When the host computer is equipped with a multicore processor, i.e. a microprocessor comprising multiple processor cores on a single chip, different software components may be run on different processor cores; also each component may make use of several processor cores for speed up of its execution.

The technical computing environment TCE comprises a simulation engine for executing block diagrams; the simulation engine may in particular comprise a solver. At least one block or subsystem SYS corresponding to a model of the plant, i.e. the dynamical system to be controlled, is executed in the simulation engine. The plant model block SYS may comprise an arbitrary number of subordinate blocks. At least one signal, e.g. a sensor output, is sent from the plant model block to a communication function S-Fct., which is integrated with the simulation engine of the technical environment. In the picture, signals are represented by arrows from a sending block to a receiving block. The communication function may advantageously replace in the simulation engine the one or more blocks for which a software-in-the-loop simulation mode has been selected and provide a mechanism for exchanging signals. The communication function may be generated by the technical computing environment, in particular based on the specification of the one or more blocks with respect to input or output ports and/or signals received or sent by these blocks.

The communication Function S-Fct. provides for an exchange of signals, which may be represented by the value of a variable, with an executable OBJ that was created from the one or more selected blocks via the production code generator PCG and the production code compiler PCO. The executable OBJ containing the compiled production code may e.g. be realized as a dynamic link library in the operating system of the host computer. Input/Output signals of the executable OBJ are sent/received by the communication function and transferred from/to the simulation environment. Also other data interesting for analysis during this testing process maybe collected and transferred from/to the executable OBJ, for example coverage data. In the shown example, the block diagram comprises an actuator model block ACT, which modifies the output signals of the executable OBJ and sends the resulting signal to the plant model SYS. As a result, a closed-loop simulation of the complete dynamical system comprising plant and controller can be performed.

The executable OBJ is external to the computing environment, and thus may be analyzed by an arbitrary debugger using mechanisms of the operating system of the host computer PC unobstructed by components of the TCE in between. In the shown example, a debugger DEB indicated as a rectangle analyzes the executable OBJ, as indicated by a dashed arrow. Thus, a software-in-the-loop simulation allows for a fast and efficient testing of the control program implemented in the production code.

Figure 6:
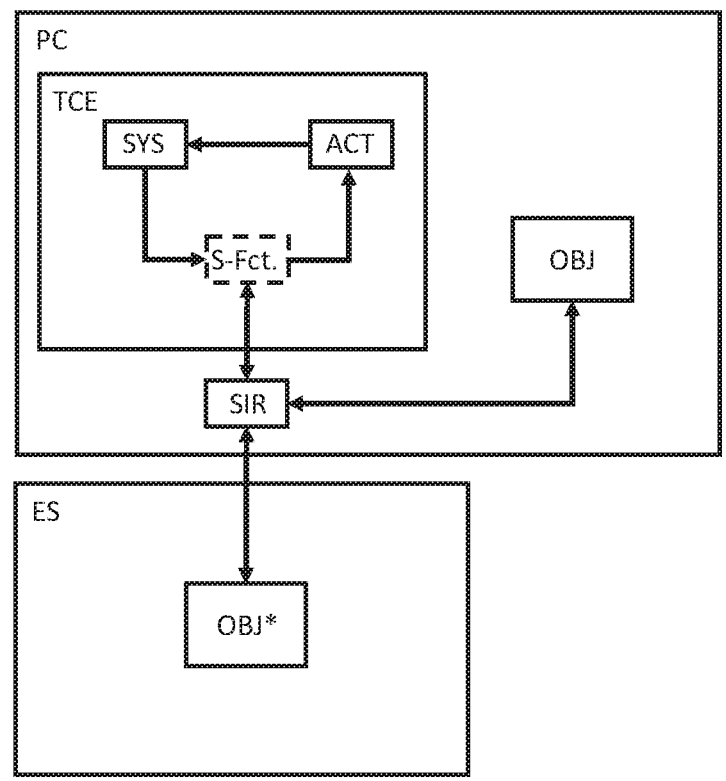
FIG. 6 is an exemplary diagram of a test environment allowing for switching between a software-in-the-loop simulation mode and a processor-in-the-loop simulation mode.

FIG. 6 displays an exemplary embodiment of a test environment that allows for switching between a software-in-the-loop simulation mode and a processor-in-the-loop simulation mode. An upper rectangle indicating the host computer PC and a lower rectangle indicating an embedded system ES are shown in the figure. The host computer PC and the embedded system ES are connected via a dedicated interface; the dedicated interface may restrict the data transfer speed, so that only a limited number of signals or corresponding variables may be exchanged without excessive slowing of the simulation and thus the debugging capabilities may be considerably limited.

As in the previous figure, the technical computing environment TCE comprises a simulation engine which executes a plant model SYS and may execute an actuator model ACT. In the shown test environment, a communication function S-Fct. is adapted to provide for an exchange of signals between the simulation engine in the TCE and the signal router SIR.

The signal router SIR allows for exchanging signals between the simulation engine and/or one or more executables; it is external to the technical computing environment, so that it uses neither the modeling environment MOD, nor the simulation engine SIM, nor the script interpreter MAT, but is only connected to the communication function S-Fct. for a transfer of signals. The signal router may be realized as a standalone executable or as a library routine, in particular a DLL, in the operating system of the host computer.

The test environment comprises a host environment for executing the control program OBJ on the host computer and a target environment for executing the control program OBJ* on the embedded system. Preferably, the signal router allows for static or on-the-fly switching between a software-in-the-loop simulation and a processor-in-the-loop simulation by redirecting the exchanged signals. Further, it is possible to simulate several subsystems or submodels in a software-in-the-loop or a processor-in-the-loop simulation mode at once by the router routing the corresponding signals for each.

When a processor-in-the-loop simulation is performed, the production code is cross-compiled on the host computer to create an executable OBJ* that is subsequently being run on another processor, in particular a microcontroller of an embedded system. In a processor-in-the-loop simulation, both the correctness of the code generator, preferably configured according to a specific set of options, and the correctness of the compiler for the target platform, preferably also configured according to a specific set of options, can be verified.

When a software-in-the-loop simulation is performed, the effect of converting high-precision operations to lower-precision operations on the accuracy of the control can be observed in order to check the correctness of the code generator. Using the mechanisms of the operating system of the host computer, a plurality of dedicated programs such as a stand-alone debugger may be interfaced to the executable OBJ for a fast and extensive analysis of the control program implemented in the production code.

Figure 7:
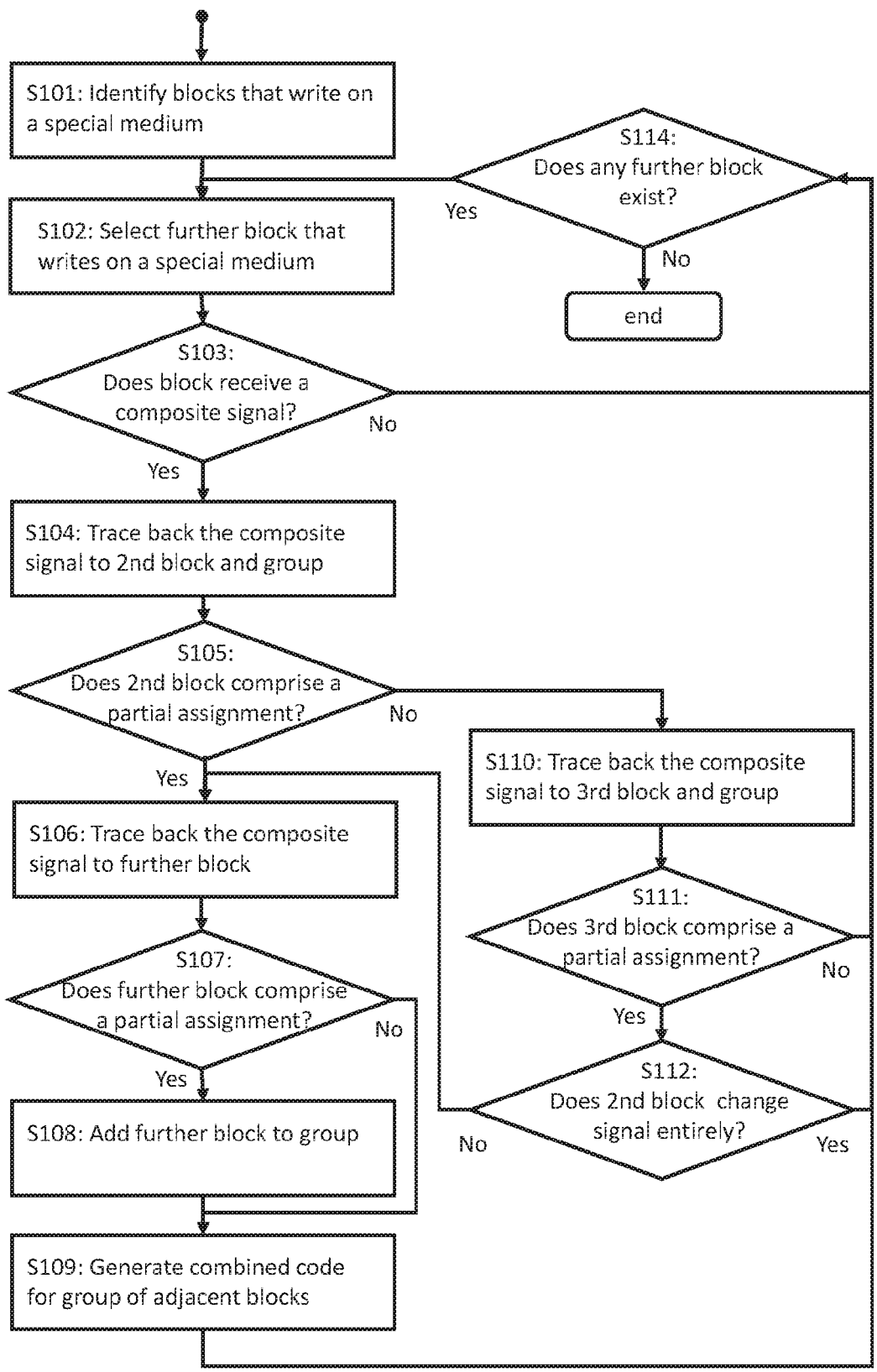
FIG. 7 is a diagram of a preferred embodiment of the inventive method.

FIG. 7 displays a schematic diagram of an exemplary embodiment of the inventive method for generating production code from a block diagram in a technical computing environment, the method being carried out by a processor of the host computer. In the shown embodiment, the input signal is a composite signal comprising two or more elements of the composite variable. This embodiment of a computer-implemented method for automatically generating production code comprises:

Identifying, in step S101, blocks in the block diagram which comprise a write operation to a special medium. Blocks associated with a special medium may e.g. contain a marker or a flag. Advantageously, the TCE may comprise a user interface for marking blocks or setting the flag. The identified blocks can be stored in a list. The write operation to a special medium may in particular address the entire composite signal.

Selecting, in step S102, a further block that comprises a write operation to a special medium. The first identified block can be extracted from the list and analyzed in the following steps, provided the list is not empty.

Checking, in step S103, if an input port of the selected block receives a composite signal that is composed of a plurality of elements. When no input port of the selected block receives a composite signal, step S114 is carried out in order to determine of any further blocks can be analyzed.

Tracing back, in step S104, the composite signal to a second block upstream of the selected block, the selected block and the second block forming a group of adjacent blocks.

Checking, in step S105, compliance with a optimization condition, the optimization condition being fulfilled when the group of adjacent blocks comprises an assignment operation that affects one or more elements of the composite signal while leaving at least one element of the composite signal unchanged. In the diagram, a simplified optimization condition is indicated: When only two blocks are present in the group of adjacent blocks, it may be sufficient to verify that the second block comprises a partial assignment, i.e. an assignment operation that affects some but not all of the elements in the composite signal.

Tracing back, in step S106 the composite signal to a further block upstream of the group of adjacent block.

Checking, in step S107, compliance with an enhancement condition, the enhancement condition being fulfilled when the further block comprises an additional assignment operation that affects only a portion of the elements affected by the assignment in the group of adjacent blocks.

Adding, in step S108, the further block to the current group of adjacent blocks, when the enhancement condition is fulfilled. Thus, the group of adjacent blocks comprises a partial partial assignment, so that the number of elements for which a write instruction needs to be generated is further reduced. When the enhancement condition is not fulfilled, the further block is not added to the current group of adjacent blocks.

Generating, in step S109, a combined production code for the current group of adjacent blocks, when the optimization condition is fulfilled. The word combined is intended to indicate that the generated code is based on the information from both blocks; write instructions are included only for those elements of the composite signal that are subject to an assignment. Additionally, the combined production code may comprise a check if the assignment actually changed the current value of the element; only if a change occurred, the write instruction for the element is executed. Because further groups of adjacent blocks may exist which comply to the optimization condition, after generating a combined production code for the current group of adjacent blocks, the method is continued in step S114.

When the optimization condition is not fulfilled, tracing back, in step S110, the composite signal to a third block upstream of the second block, the selected block, the second block and the third block forming an enlarged group of adjacent blocks.

Checking, in step S111, if the enlarged group of adjacent blocks complies with a secondary condition. The secondary condition is fulfilled when the third block comprises an assignment operation that affects one or more elements of the composite signal while leaving at least one element of the composite signal unchanged. For simplicity, tracing back and checking compliance with the secondary condition is only carried out for groups of up to three blocks in the shown diagram. A person skilled in the art will appreciate that tracing back could in principle be continued for a larger number of blocks, provided a suitable stopping condition is verified. A suitable stopping condition could e.g. be a maximum number of blocks for tracing back and/or reaching the border of the subsystem in the block diagram. When the (simplified) secondary condition is not fulfilled, the method continues at step S114.

Checking, in step S112, if the enlarged group of adjacent blocks complies with an auxiliary condition, when compliance with the secondary condition has been verified. The auxiliary condition is fulfilled when no intermediate block in the group of adjacent blocks changes the composite signal in its entirety. In the shown embodiment, a simplified inverse condition is checked: When the current second block changes the composite signal in its entirety, the auxiliary condition cannot be fulfilled, and no combined production code will be generated for the current enlarged group of adjacent blocks.

When the second block does not change the composite signal in its entirety, the method continues at step S106, i.e. a combined production code is generated for the enlarged group of adjacent blocks. By restricting write instructions to those elements in the composite signal that are assigned a new value, wear of the special medium, in particular flash memory, is reduced—the lifetime of an ECU executing the control program is extended.

Compliance with the optimization condition can be checked for each block that comprises a write operation on a special medium. Thus, whether a combined was generated or not, the method continues in step S114 by checking if a further block exists which writes on a special medium. As long as this is the case, the method continues at step S102, i.e. a further block is selected and analyzed. When no further block exists, the method is stopped.

Figures 8, 9A, 9B:
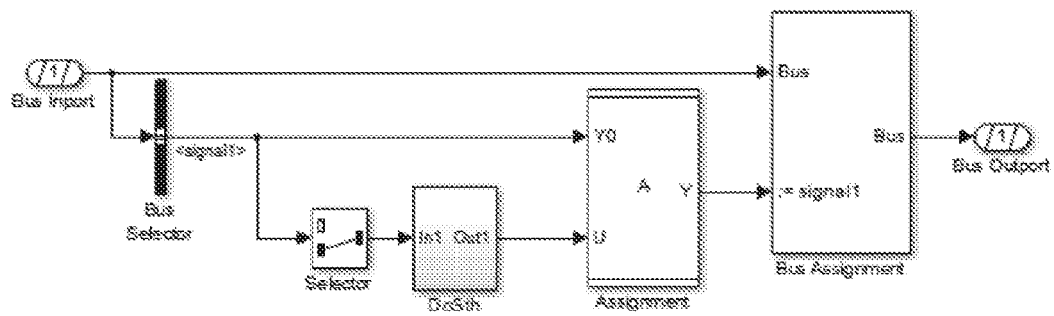
FIG. 8 is an exemplary block diagram to which the inventive method may be applied.
FIG. 9a is an example of production code according to the state of the art.
FIG. 9b is an example of combined production according to the invention.

FIG. 8 displays an exemplary block diagram; the blocks will be described briefly from left to right. A composite signal (a bus) is received by an input port. Via a bus selector block, an element of the composite signal is selected. In an assignment block, a new value is assigned to the selected element of the composite signal. Subsequently, the selected element is merged with the other (unchanged) elements of the composite signal. The entire composite signal is send to an output port, which is marked to be associated with a special medium (e.g. Flash memory).

FIG. 9a displays an example of production code according to the state of the art. The defined structure S represents a composite signal, that comprises e.g. a scalar variable a, an array b of scalar elements and an array c. Only the element b[3] of the composite signal is subject to an assignment. However, the entire composite signal is copied to a temporary variable and subsequently written to the special medium.

FIG. 9b displays an example of combined production code according to the invention; the structure of the composite is as discussed above. Write instructions are only generated for the element b[3] which is subject to an assignment. In order to exclude simple reassignments of the same value, the combined production code additionally comprises a check if the assigned value of the element b[3] is actually different from the previous one. The number of write accesses to the special medium (e.g. Flash memory) is considerably reduced.

Those skilled in the art will appreciate that the order of at least some of the steps may be changed without departing from the scope of the claimed invention. For instance, checking compliance with the auxiliary condition selection of a simulation mode may be carried out before or after checking compliance with the secondary condition.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for generating production code from a block diagram in a technical computing environment on a host computer, wherein blocks in the block diagram comprise a number of input ports for receiving signals and a number of output ports for sending signals, the method being carried out by a processor of the host computer, the method comprising:
   identifying by the processor a first block in the block diagram which comprises a write operation of a composite variable to a special medium, wherein the first block receives an input signal that is composed of one or more elements of the composite variable comprising a plurality of elements;
   tracing back the input signal to a second block that is upstream of the first block, the first block and the second block forming a group of adjacent blocks;
   checking compliance with a optimization condition, the optimization condition being fulfilled when the group of adjacent blocks comprises an assignment operation that affects one or more elements of the input signal but leaves at least one element of the composite variable unchanged; and
   generating a combined production code for the group of adjacent blocks, when the optimization condition is fulfilled, so that the combined production code comprises write instructions only for elements of the composite variable that are affected by the assignment operation.

2. The method of claim 1, if the optimization condition is not fulfilled by addition of the second block, the method further comprises:
   tracing back the input signal to a leading block upstream of the group of adjacent blocks, thus enlarging the group of adjacent blocks;
   checking compliance with a secondary condition, the secondary condition being fulfilled when the leading block upstream comprises an assignment operation that affects one or more elements of the input signal while leaving at least one element of the composite variable unchanged; and generating the combined production code for the enlarged group of adjacent blocks, when the secondary condition is fulfilled, so that the combined production code comprises write instructions only for elements of the composite variable that are affected by the assignment operation.

3. The method of claim 2, wherein the tracing back of the input signal is continued in iterations so that a further block becomes the leading block for a further enlarged group of adjacent blocks in each iteration until the secondary condition is fulfilled or one or more of the following stopping conditions are fulfilled:

an intermediate block in the group of adjacent blocks changes the composite variable in its entirety;

a predefined number of adjacent blocks has been traced back;

a group of adjacent blocks is bigger than a given threshold after having been enlarged; or a boundary of a defined system or subsystem has been reached, so that there exists no further leading block upstream of the group of adjacent blocks in a given hierarchical level of the block diagram.

4. The method of claim 2, wherein the input signal comprises all elements of the composite variable, and wherein checking compliance with the secondary condition comprises checking compliance with an auxiliary condition, the auxiliary condition being fulfilled when no intermediate block in the group of adjacent blocks changes the composite variable in its entirety.

5. The method of claim 1, wherein generating a combined production code includes, prior to actually generating the combined production code, tracing back the input signal to a further block upstream of the group of adjacent blocks, checking compliance with an enhancement condition, the enhancement condition being fulfilled when the further block comprises an assignment operation that affects one or more elements of the input signal but leaves at least one element of the input signal unchanged, and including the further block in the group of adjacent blocks when the enhancement condition is fulfilled.

6. The method of claim 1, wherein, if the first block receives more than one input signal, the steps of the method of claim 1 are carried out independently for each input signal so that a group of adjacent blocks is created for each input signal, such that compliance with the optimization condition or compliance with the secondary condition is being checked, and such that the combined production code is generated for each group of adjacent blocks which fulfill the optimization condition or the secondary condition, so that the combined production code comprises write instructions only for the elements of each input signal that are affected by an assignment operation.

7. The method of claim 1, wherein generating the combined production code comprises generating instructions to compare a previous value of the one or more elements of the composite variable affected by an assignment operation with a new value to be written, and wherein the write instructions are only carried out when the previous value differs from the new value.

8. The method of claim 7, wherein an input signal of the first block is being read from an initial block upstream of the first block, wherein the initial block corresponds to the same composite variable as the first block.

9. The method of claim 1, wherein any of the blocks corresponding to the special medium are indicated via a marker in each block or via a marker in an input signal received by each block.

10. The method of claim 8, wherein a marker can be set by a user editing the block diagram in a graphical user interface of the technical computing environment.

11. The method of claim 1, wherein the special medium is a memory or a storage medium or a flash memory with an effective write speed lower than a predefined threshold and/or a limited number of permissible write cycles.

12. The method of claim 1, wherein the input signal is a composite signal being created by assembling a number of signals of elements or signals of an elementary data type in a combination block upstream of the first block.

13. The method of claim 12, wherein an assignment operation that affects one or more elements of the input signal is implemented by combination of a selector block comprising a selection operation and a calculation block comprising a calculation of a new value for one or more selected elements of the input signal, and wherein the selector block and the calculation block are considered as one block and added to the group of adjacent blocks.

14. The method of claim 1, wherein the composite variable comprises a vector and/or a matrix and/or wherein the input signal is a bus, and wherein, if the composite variable comprises a vector or a matrix, an assignment operation that affects one or more elements of the input signal while leaving at least one element of the composite variable unchanged is determined by identifying assignment operations that concerns a limited number of indices in a whole set of indices of the vector or matrix.

15. The method of claim 1, wherein write instructions for writing on the special medium are carried out indirectly via a buffer comprising the entire composite variable, and wherein the buffer is written in its entirety when at least one element of the composite variable has been affected by an assignment operation.

16. A non-transitory computer readable medium containing instructions that, when executed by a processor of a computer system, cause the computer system to carry out the method according to claim 1.

17. A computer system, comprising a processor, a random access memory, a graphics controller connected to a display, a serial interface connected to at least one human input device, and a nonvolatile memory on a hard disk or solid state disk, the nonvolatile memory comprising instructions that, when executed by the processor, cause the computer system to carry out the method according to claim 1.

* * * * *